United States Patent
Sanders et al.

(10) Patent No.: US 8,098,380 B2
(45) Date of Patent: Jan. 17, 2012

(54) RESONATOR FIBER OPTIC GYROSCOPE (RFOG) WITH REDUCED BIAS ERROR FROM HIGH ORDER SPATIAL MODES

(75) Inventors: Glen A. Sanders, Scottsdale, AZ (US); Tiequn Qiu, Glendale, AZ (US); Lee Strandjord, Tonka Bay, MN (US)

(73) Assignee: Honeywell International Inc., Morristown, NJ (US)

( * ) Notice: Subject to any disclaimer, the term of this patent is extended or adjusted under 35 U.S.C. 154(b) by 380 days.

(21) Appl. No.: 12/506,855

(22) Filed: Jul. 21, 2009

(65) Prior Publication Data
US 2011/0019198 A1  Jan. 27, 2011

(51) Int. Cl.
*G01C 19/72* (2006.01)
(52) U.S. Cl. ....................................................... 356/461
(58) Field of Classification Search .......... 356/459–461, 356/470, 483
See application file for complete search history.

(56) References Cited

U.S. PATENT DOCUMENTS

| | | | | |
|---|---|---|---|---|
| 4,825,261 | A | * | 4/1989 | Schroeder ..................... 356/461 |
| 4,842,409 | A | * | 6/1989 | Arditty et al. ................ 356/460 |
| 5,136,668 | A | * | 8/1992 | Malvern ......................... 385/27 |
| 5,296,912 | A | | 3/1994 | Strandjord et al. |
| 7,522,284 | B2 | * | 4/2009 | Sanders et al. ................ 356/461 |

* cited by examiner

Primary Examiner — Michael A Lyons
(74) Attorney, Agent, or Firm — Fogg & Powers LLC (57) ABSTRACT

Multiple resonator fiber optic gyroscope (RFOG) configurations comprising one or more mode filters inside the resonator are adopted to effectively suppress unwanted high order spatial modes which can be a significant source of gyro bias errors. The resonator comprises at least a loop fiber, either two or more in/out coupling elements, and connectors that link elements into a circulating loop. Directional elements may be used to separate output light from input light in some of the embodiments. In all embodiments, mode filters are placed in the resonator to guarantee that the light reaching the photodetector is filtered by at least one mode filter in the resonator at least once. The mode filters may contain both spatial mode filters (such as single mode fibers or waveguides) and polarization mode filters (such as polarizing elements) so that both spatial and polarization mode filtering can be implemented simultaneously.

29 Claims, 8 Drawing Sheets

RESONATOR FIBER OPTIC GYROSCOPE (RFOG) WITH REDUCED BIAS ERROR FROM HIGH ORDER SPATIAL MODES

BACKGROUND OF THE INVENTION

A resonator fiber optic gyroscope (RFOG) is a rotation sensing device that comprises a fiber resonant ring cavity. When the gyro has nonzero rotation rate around an axis normal to the plane of the ring cavity (also called resonator), the effective round trip path lengths for lightwaves propagating in the two opposite directions are different. This so-called Sagnac effect causes the ring cavity to exhibit different resonance frequencies for the two opposite directions which are often referred to as clockwise (CW) and counter-clockwise (CCW) for convenience. The resonance frequency difference is proportional to the gyro rotation rate.

To measure the resonance frequency difference of the ring cavity in CW and CCW directions, monochromatic lightwaves are coupled into the resonator in both directions and their frequencies are separately tuned/locked to the peaks (or dips, depends on how light is coupled out of the resonator) of the resonance characteristics. The term "resonance characteristic" or simply "resonance" of a ring cavity refers to the curve of resonator output power as a function of input light frequency. This curve typically has a periodic pattern of peaks (or dips) whose corresponding frequencies are the resonance frequencies. The frequency difference between two adjacent peaks (or dips) of the same spatial-mode and polarization-mode of the resonator, just differing by one wavelength of optical pathlength within the resonator, is the resonator free spectral range (FSR). It is determined by the round trip propagation time of the resonator.

For precise resonance frequency measurement, the resonator cavity should support only a single spatial mode and a single polarization mode so that signal errors generated from unwanted spatial and polarization modes can be negligible. In prior art inventions, intra-resonator polarizers with high polarization extinction ratio (PER) have been suggested to suppress the unwanted polarization modes. However, the resonator optical fibers are often assumed to support pure single spatial mode and few discussions of the impact of high order spatial mode were presented. Recently there are increasing interests in using bandgap hollow core fiber in fiber optic gyroscopes to take its advantages (compared to traditional solid core fibers) of low sensitivity to environmental changes, negligible nonlinear refraction index, and low phase fluctuations. During the research of hollow core fiber gyroscopes, it was found that the current commercially available low loss hollow core fiber may weakly support high order spatial modes, sometimes by design, and sometimes due to imperfections in either design or manufacturing process. Finding the mitigation methods of the impact of high order spatial mode on gyro performance becomes increasingly important.

In cases where resonator loop-fibers weakly support high order spatial modes, i.e. modes other than the fundamental one, the impact on gyro bias stability may be significant. Due to modal dispersion, high order modes travel in different optical paths and have different round-trip phase delays with respect to the fundamental mode. When the resonator output light is detected, light from the higher order mode may interfere with the fundamental mode, producing resonance asymmetry that varies with environmental changes. Although this interference may be suppressed to some degree by the spatial averaging of two spatially-orthogonal modes, the suppression may be compromised by imperfect spatial averaging; e.g. when the detected light is traveling through a finite aperture or the detector has spatial inhomogeneities. Although possibly weak in intensity, the high order modes can be a severe limiting factor of bias stability of a high performance RFOG.

SUMMARY OF THE INVENTION

The present invention reduces the impact of the higher order modes on a resonator fiber optic gyroscope (RFOG) bias stability through spatial mode filtering. Round trip losses of the high order spatial modes are increased significantly by spatial mode filters properly placed inside the resonator, leading to very significant reduction of high order mode induced bias errors.

In one aspect of the invention, an RFOG includes a loop fiber having a first end and a second end, a first and a second in/out coupling element having at least three ports: A, B and C, a first and a second directional element having at least three ports: 1, 2, and 3, a first and a second light source, a first and a second detector, and a mode filter having a first and a second end. The (first or the second, which are substantially the same) in/out coupling element couples substantial amount of light from port A to port B and from port B to port A. A fraction of light is coupled from C to B and from B to C but prevents light from being coupled from port A to port C and from port C to port A. The (first or the second, which are substantially the same) directional element couples substantial amount of light from port 1 to port 2, from port 2 to port 3, but prevents light from being coupled from port 1 to port 3.

The RFOG resonator is formed by connecting the first and the second end of the loop fiber to port A of the first and the second in/out coupling elements, connecting the port B of the first and the second in/out coupling elements to the first and the second end of the mode filter. The first (second) directional element receives light from the first (second) light source at port 1, directing it to the corresponding port 2 that is connected to port C of the first (second) in/out coupling element. The light is then coupled into the resonator at port B of the first (second) in/out coupling element. They circulate in the CW (CCW) direction of the resonator. A fraction of CW (CCW) light is coupled out of the resonator at the second (first) in/out coupling element at port C, directed to port 2 of the second (first) directional element, and coupled to the second (first) detector that is connected to port 3 of the second (first) directional element. The mode filter includes single mode optical elements such as single mode fibers and waveguides that provide substantial suppression of high order spatial mode in the resonator. In addition, polarizing elements may be included in the mode filter so that only one low loss polarization mode is supported by the resonator.

In all the embodiments, the light reaching the photodetector is filtered by at least one mode filter in the resonator. This significantly reduces/removes the impact of unwanted modes from interfering with the fundamental mode which is critical for accurate measurement of the resonance frequencies, and thus rotation rate.

BRIEF DESCRIPTION OF THE DRAWINGS

Preferred and alternative embodiments of the present invention are described in detail below with reference to the following drawings.

DETAILED DESCRIPTION OF THE INVENTION

The present invention is described below for use in a resonator fiber optic gyroscope (RFOG) having a ring cavity. It should be understood that the ring cavity can include discrete optical elements and/or waveguide optical elements. The term "spatial modes" generally includes modes of waveguides, modes of the discrete optical elements, and modes of the free space between optical elements. Although the present invention is focused on suppression of unwanted high order spatial modes of the resonator (ring cavity), it does not mean to ignore suppression of the unwanted polarization modes. If not mentioned explicitly, the "single spatial mode filter" or simply "mode filter" may include highly polarizing elements (in addition to spatial mode filtering elements) that substantially suppress one polarization mode and pass the other polarization mode. The polarizing elements in the mode filter can be polarizing waveguides, polarizing fibers, and polarizers.

An ideal RFOG should support a single mode in its ring cavity for accurate measurement of the resonant frequencies that are used to determine rotation rate. The so called "single mode" is defined as a special state of light, in the sense of either polarization state or spatial field distribution, which reproduces its state after a round-trip of the resonator except for a fixed attenuation coefficient and a fixed phase delay relative to the light field just before the previous round-trip at each point along the ring. Thus the successive light waves traveling in the same mode constructively interfere at each point within the ring. Sometimes this mode is called the "Eigen-mode". The complex coefficient that describes the round-trip field amplitude transmission and phase shift is called the "Eigen-value" of the mode. As long as the resonator supports only one Eigen-mode, there will be substantially only one resonance in each of the CW and CCW directions. The resonance frequency difference can thus be accurately determined. An embodiment of the present invention is to effectively make a ring resonator with only one Eigen-mode, or equivalently, make a resonator in which all but one Eigen-mode (the fundamental mode) have a virtually zero amplitude transmission (zero modulus) for its eigenvalue magnitude in both directions of propagation. It is also the objective of this invention that fundamental Eigen-mode of the resonator resonates with high finesse for greater signal to noise; that is, that the magnitude of eigenvalue be as close to unity as possible. When more than one Eigen-mode is supported by the resonator, there will be multiple resonances which can overlap, producing distortions and asymmetries in the resonance lineshape (signal resonance, or resonance of the fundamental mode) intended for use in rotation sensing, therefore bias errors in the gyro output. Furthermore, small amounts of light from off-resonance modes can interfere with the light traveling in the resonance of the fundamental mode via imperfect spatial averaging or polarization dependent loss in the detection process. It is possible to use spatial mode filters in the resonator to reduce the impact of unwanted spatial mode on gyro bias performance. This invention provides several embodiments with modes filters in an RFOG.

Figure 1:
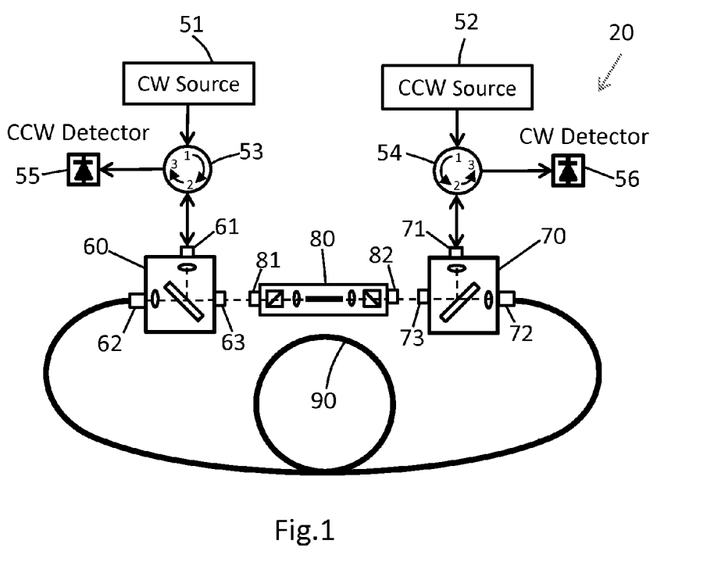
FIG. 1 shows an embodiment of a symmetric RFOG having one spatial mode filter and two in/out coupling elements in the ring cavity.

FIG. 1 illustrates an embodiment of an RFOG 20 with mode filters. The RFOG 20 includes light sources 51 and 52, directional optical elements 53 and 54, photodetectors 55 and 56, resonator in/out coupling elements 60, 70, a fiber loop 90, and a mode filter 80. The directional optical elements 53, 54 may be an optical circulator, a fiber coupler or simply a mirror, or combinations thereof which can direct light from port 1 to port 2 but substantially block light at port 1 from entering port 3, and direct light from port 2 to port 3. The resonator in/out coupling elements 60 and 70 are optical elements with at least three ports 61-63 and 71-73. The element 60 allows light to propagate from port 62 to 63. The element 70 allows light to propagate from port 72 to 73 without significant losses. In addition the elements 60, 70 provide coupling (propagation) of light between the ports 61, 71 and the ports 63, 73 respectively but prohibits light to propagate between the ports 61, 71 and 62, 72 respectively. Although the in/out coupling elements 60 and 70 can be a partial reflection minor in its simplest form, other devices such as fiber couplers, waveguide couplers and beam splitters are possible.

Lightwaves generated from the light sources 51 and 52 are coupled into port 1 of the directional coupling elements 53 and 54. The elements 53 and 54 direct substantial amount of the input light to port 2 and couple them into the ports 61 and 71 of the in/out coupling elements 60 and 70. A fraction of the light entering ports 61 and 71 is directed to the ports 63 and 73 so that they propagate in the CW and CCW direction of the resonator. Lightwaves coupled into the resonator at ports 63 and 73 in the CW (CCW) direction consecutively propagate through the mode filter 80, the other elements 70 and 60, the fiber loop 90 and enters original element 60 or 70 at the ports 62 or 72. A substantial amount of the light is directed to the port 63 or 73 for the light to recirculate in the resonator. A small fraction of the CW (CCW) light coupled into the ports 73, 63 is coupled out of the resonator at the ports 71, 61 and propagates to port 2 of the directional elements 54, 53, which directs that received light to the photodetectors 56, 55 for resonance frequency detection.

In the RFOG configuration of FIG. 1, the mode filter 80 plays a critical role in suppression of the high order spatial modes (modes other than the fundamental mode) in the resonator. Since only one mode is supported by the mode filter, the supported mode becomes the only Eigen-mode of the resonator that can reproduce its modal distribution after round trip travel through the resonator. Higher order spatial modes of the resonator that might otherwise be supported by the existence the more than one mode in the loop fiber 90 are substantially rejected by the mode filter 80. All the lightwaves coupled out of the resonator pass through the mode filter 80 at least once so that the light that reaches the photodetector 55, 56 is from the single Eigen-mode of the resonator. This eliminates the interference of unwanted modes with the primary mode, resulting accurate detection of resonance frequency. Another advantage of this embodiment is that, the mode filter 80 is common for both CW and CCW propagating waves, leading to higher degree of symmetry with respect to the CW and CCW lightwaves, which helps to cancel bias errors that are common to both CW and CCW resonators.

Figure 2:
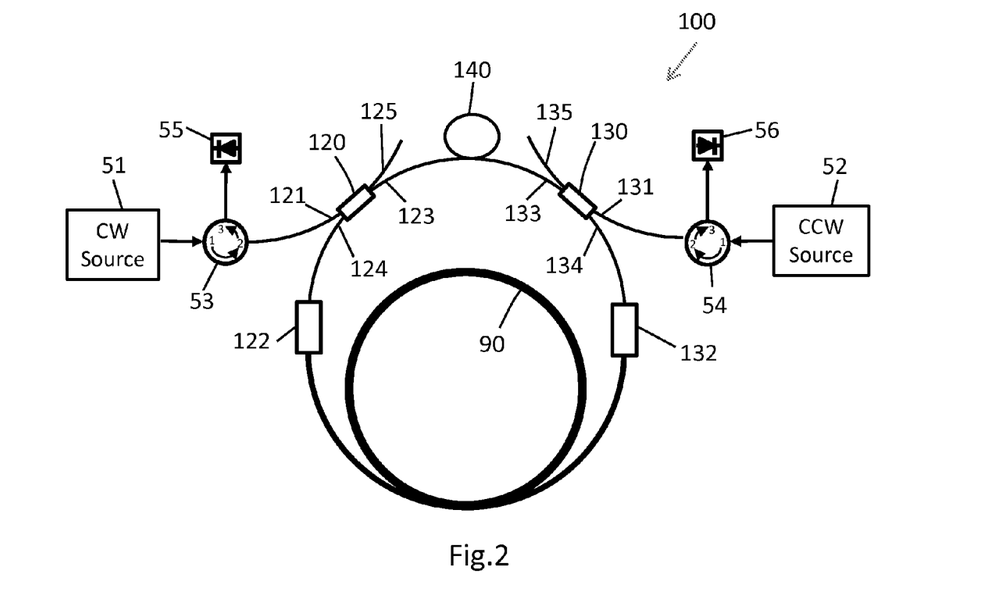
FIG. 2 shows an embodiment of an RFOG with configuration similar to that shown in FIG. 1 but using fiber couplers for in/out coupling and single mode fiber as mode filter.

In FIG. 1 it is important that a very high fraction, say "x", of light passes from the optical fiber loop 90 to the spatial filter 80 and back to the fiber loop 90, in both CW and CCW directions. This also means that only a small portion of the light say "y" is tapped out of the ring resonator, including the light to directional coupler elements 54 and 53. FIG. 1 shows this being effected by coupling elements 60 and 70 which are depicted as having reflectors with high transmission coefficients (from the ports 62 to 63 and from the ports 72 to 73) and low reflection coefficients from the ports 63 to 61 and from the ports 73 to 71. This is one method of achieving the desired high x-value and low y-value, which are based on optimizing signal to noise ratio in the gyro. The above technique is said to use a transmission mode for the coupling elements in 60 and 70 as depicted. It must be noted that in FIG. 1, the coupling elements 60 and 70 could be depicted also in a reflection mode; that is, where the optical element internal to them has high reflectivity and low transmittance. In this case, although not shown here, to accomplish the requisite high x-value and low y-value, the ends of the coil fiber 90 are attached to the ports 61 and 71 of the coupling elements 60 and 70, and the directional coupler elements 53 and 54 are attached to the ports 62 and 72 of the coupling elements 60 and 70 respectively. The following drawings and embodiments may depict the case of usage of transmission mode optics for the coupling elements; however, reflection mode optics may also be used with re-arrangements of ports similar to that described for FIG. 1, and these changes can be made without departing from the spirit and scope of the invention. In the cases of fiber couplers the rearrangement of ports may be accomplished by switching coupler leads for inclusion of a coupler of high (rather than low) coupling ratio, as is known by those skilled in the art Fiber/waveguide devices are sometimes preferred over devices comprising bulk elements because of potentially smaller form factor, greater ruggedness, and improved reliability. FIG. 2 illustrates an RFOG 100 with similar configuration shown in FIG. 1 but with components in a fiber form. In this embodiment, in/out coupling is performed by single mode fiber couplers 120 and 130. For a typical 2×2 fiber coupler 120, 130, there is light coupling between a first port 121, 131 and a second port 123, 133, and between the second port 123, 133 and a third port 124, 134. The RFOG 100 includes a piece of single mode filter fiber 140 that performs mode filtering. The fiber 140 may be a polarizing single mode fiber that supports only one spatial/polarization mode. Coupler fibers at the ports 121, 123, 124, 125, 131, 133, 134, 135 and the mode filter fiber 140 are preferably of the same type single mode fiber. The coupler fibers 124, 123, 140, 133 and 134 may be a single piece of fiber so that no additional connections (splices) are necessary. Elements 122 and 132 connect the ends of the loop fiber 90 to the single mode coupler fiber at the ports 124 and 134. The elements 122, 132 are fiber splices and/or optical elements that couple substantial amount of light between the single mode coupler fiber and the loop fiber 90. The propagation of the light in the CW and CCW directions in this embodiment are similar to those described for FIG. 1. All the lightwaves coupled out of the resonator have to pass through the mode filter 140 at least once so that unwanted high order spatial modes in the resonator including the loop fiber 90, the couplers 120, 130 and the mode filter 140 are substantially eliminated.

Although not required (explicitly mentioned) in all the embodiments of the present invention, the loop fiber preferably conducts light as much as possible in a single spatial mode (or is ideally "single mode"). In this way, losses in the resonator are minimized. The optical elements in the resonator and connections (e.g., splices) between fibers and should provide as little loss as possible.

Figure 3:
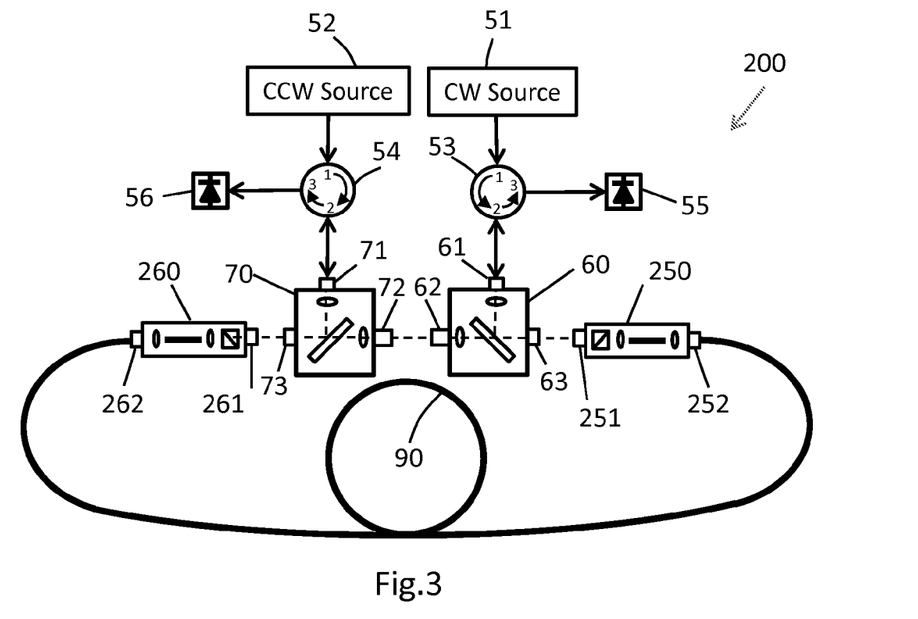
FIG. 3 shows another embodiment of a symmetric RFOG having two spatial mode filters and two in/out coupling elements in the ring cavity.

FIG. 3 shows another embodiment of an RFOG 200 with a different configuration. The RFOG 200 includes two mode filters 250 and 260 instead of one mode filter shown in FIG. 1. The light sources 51 and 52, the directional elements 53 and 54, the photodetectors 55 and 56, and the in/out coupling elements 60 and 70 are the same as those shown in FIG. 1 except that their positions are changed with respect to each other. Lightwaves generated from the sources 51 and 52 are directed by the elements 53, 54 and 60, 70 towards the mode filters 250, 260 after being coupled into the resonator in the CW, CCW directions. All light passes at least once through the two mode filters 250, 260 before being coupled out of the resonator by the in/out coupling element 60, 70 to the detector 55, 56. The loop fiber 90 is placed between the filters 250 and 260. The two mode filters 250, 260 may provide higher level of mode suppression than a single mode filter or may provide convenience (lower cost) in manufacturing. When the two mode filters 250, 260 and the two in/out coupling elements 60, 70 are substantially the same (mirror image of each other), this configuration is highly symmetric which is considered advantageous for canceling bias errors by forcing phase contributions to CW and CCW waves due to parasitic light-waves to be common to CW and CCW directions.

Figure 4:
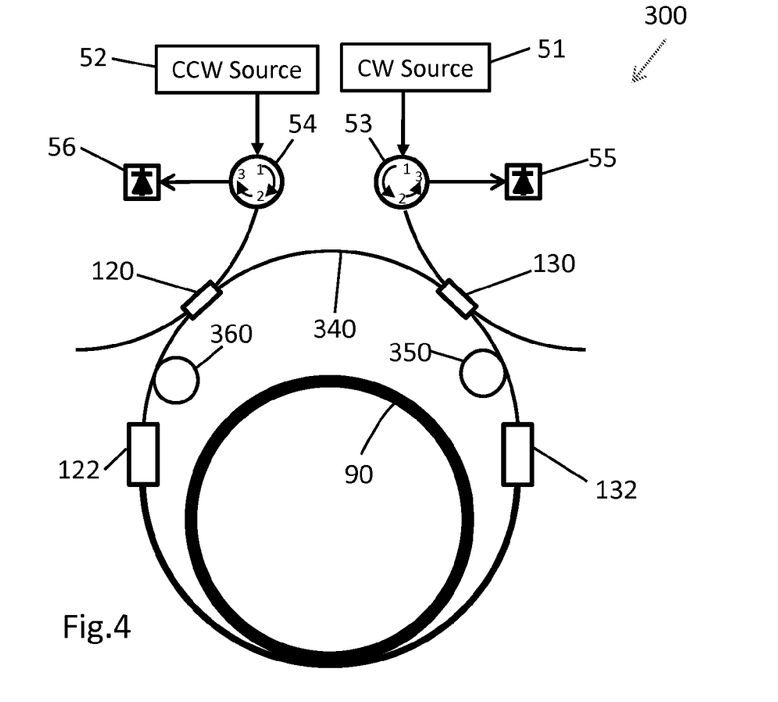
FIG. 4 shows an embodiment of an RFOG with configuration similar to that shown in FIG. 3 but using fiber couplers for in/out coupling and single mode fibers as mode filters.

FIG. 4 illustrate an embodiment of an RFOG 300 with configuration close to FIG. 3 but using the fiber couplers 120, 130 for the in/out coupling elements. The single mode fiber couplers 120 and 130 similar to those in FIG. 2 are similarly used as in/out coupling elements. Elements 122 and 132 are fiber splices and/or optical elements identical to those shown in FIG. 2. However, the lightwaves are injected into the resonator from a different port of the coupler (compared to FIG.

2). Single mode fiber filters 360 and 350 connect the couplers 120, 130 to the loop fiber 90 through connecting elements 122, 132. The filters 350, 360 support only one spatial mode in order to function as mode filters. A fiber 340 connects the two couplers 120, 130 and is preferably a single mode fiber for more effective mode-filtering in the RFOG 300. In practice, the fibers 340, 350 and 360 preferably form a single piece of single mode fiber so that no additional connections (splices) are necessary. In addition, all the fibers in the RFOG 300 may be polarizing fibers for suppression of unwanted polarization modes. In this embodiment, all light passes at least once through each of the mode filters 350, 360 before being coupled out of the resonator. The resonator is symmetric with respect to CW and CCW directions.

Figure 5:
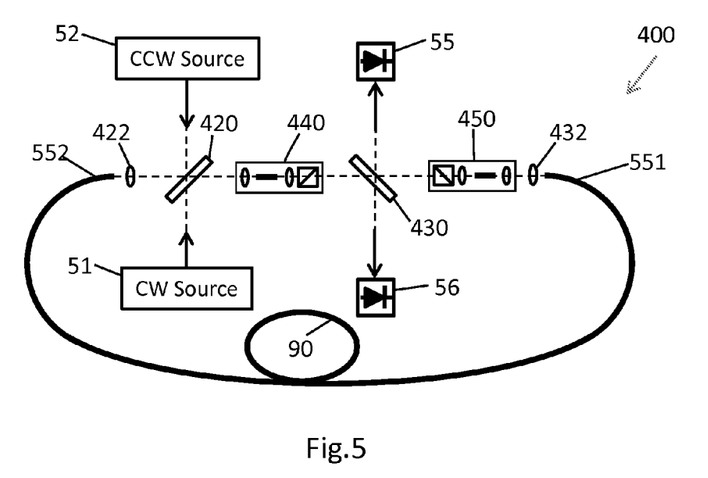
FIG. 5 shows an embodiment of an asymmetric RFOG includes two spatial mode filters and two in/out coupling elements in the ring cavity.

FIG. 5 illustrates another embodiment of an RFOG 400 with two mode filters. For simplicity, in/out coupling elements 420 and 430 are represented by partial reflection mirrors. However, it is not meant to limit the embodiment to using mirrors as the in/out coupling elements 420, 430. Any optical device, such as fiber couplers, circulators, and waveguides having equivalent/similar beam direction functions as a partial reflection mirror can be used in the RFOG 400 and in the following embodiments if mirrors are shown as the in/out coupling elements. In this embodiment, lightwaves for both CW and CCW propagation directions are coupled into the resonator by the element 420 and coupled out by the element 430 to the detectors 56 and 55. A mode filter 440 is placed between the mirror 420 and 430 so that CW light has to pass it at least once before hitting the detector 56. A mode filter 450 is placed between the mirror 430 and a loop fiber end 551 so that the CCW light has to pass through the mode filter 450 at least once before reaching the detector 55. The recirculating lightwaves are mode-filtered by both of the mode filters 440 and 450 in each round trip, to effect the requisite mode-filtering. Although this configuration is not symmetric with respect to CW and CCW light path in the resonator, it does not need the directional elements 53 and 54 shown in FIGS. 1-4, to separate the output beams from the input beams which could reduce component count thus lowering the cost of the RFOG.

Figure 6:
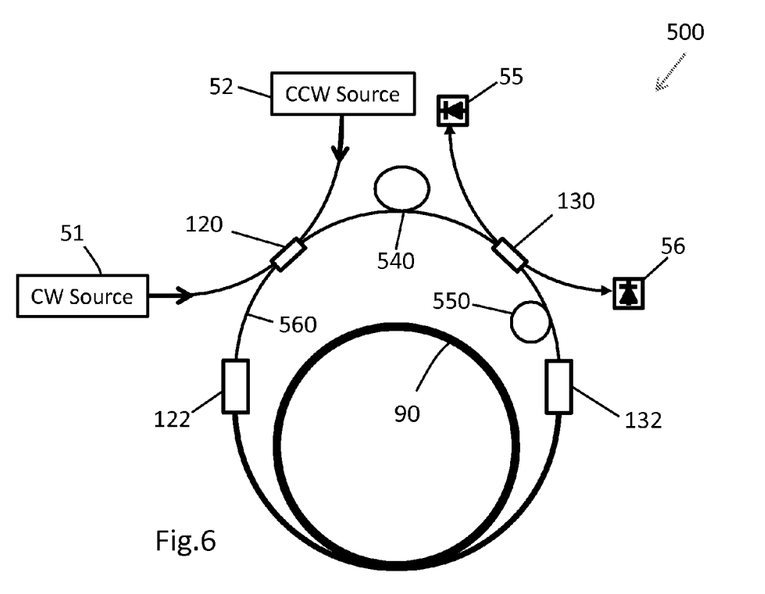
FIG. 6 shows an embodiment of an asymmetric RFOG with configuration similar to that shown in FIG. 5 but using fiber couplers for in/out coupling and single mode fibers as mode filters.

FIG. 6 shows an RFOG 500 in a fiber coupler version of the RFOG 400 shown in FIG. 5. The couplers 120, 130, the light sources 51 and 52, the detectors 55 and 56, the connectors 122 and 132, and the loop fiber 90 are the same as those shown in FIGS. 2 and 4. However, their arrangements are changed. The coupler 120 couples light into the resonator in both CW and CCW directions. The coupler 130 couples light out of the resonator to the detectors 56 and 55. A single mode fiber mode filter 540 is placed between the two couplers 120, 130 and a single mode fiber 550 is placed between the coupler 130 and the loop fiber 90 and a single mode fiber 560 is place between coupler 120 and loop fiber 90. It is desirable that single mode fiber 540, 550 and 560 form a single piece of fiber so that no extra connections and splices are needed.

The above embodiments of RFOG all have two in/out coupling elements in the resonator. For those with symmetric configurations (e.g. those shown in FIGS. 1-4) directional optical elements (e.g. elements 53 and 54) are needed in this type of RFOG to separate the input and output beams. Asymmetric configurations (e.g. those shown in FIGS. 5 and 6) are to be adopted to avoid the use of extra directional elements in an RFOG having two in/out coupling elements. However, it is possible to achieve symmetry in the RFOGs if three or more in/out coupling elements are used. In the following embodiments, placements of mode-filters in symmetric RFOG with three in/out coupling elements are discussed. Extension to even higher number of coupling elements is possible but less preferable due to signal to noise performance degradation associated with higher resonator round-trip losses when more coupling elements are used in the resonator.

Figure 7:
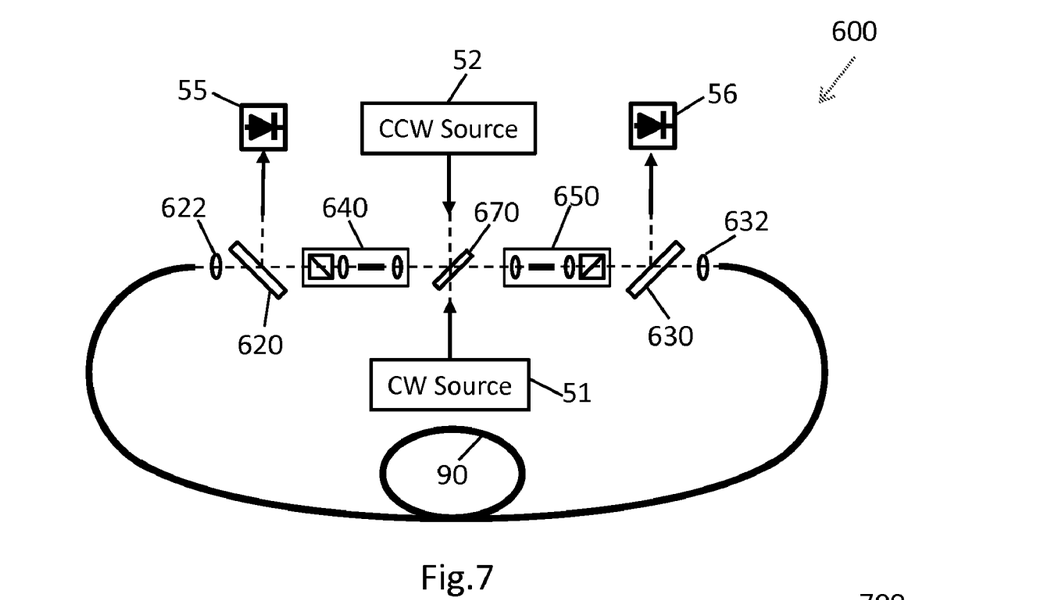
FIG. 7 shows an embodiment of a symmetric RFOG having two spatial mode filters and three in/out coupling elements in the ring cavity.

FIG. 7 shows an embodiment of a symmetric RFOG 600 with two mode filters 640, 650 and three in/out coupling elements 620, 630, 670. The lightwaves are coupled into the resonator by the element 670 (e.g. a partially reflective mirror) in the CW and CCW directions. Light is partially coupled out of the resonator by the element 630 (for the CW light) and the element 620 (for CCW light). The mode filters 640 and 650 are placed between the input coupling element 670 and the output coupling elements 620 and 630. All the lightwaves have to pass one mode filter 640 or 650 at least once before being coupled out of the resonator. Since lightwaves are coupled in and out of the resonator by separate elements, there is no need to use directional elements to separate them. Provided that the mode filters 640 and 650 and the elements 620 and 630 are substantially the same, the configuration of the RFOG 600 is substantially symmetric with respect to CW and CCW propagating waves.

Figure 8:
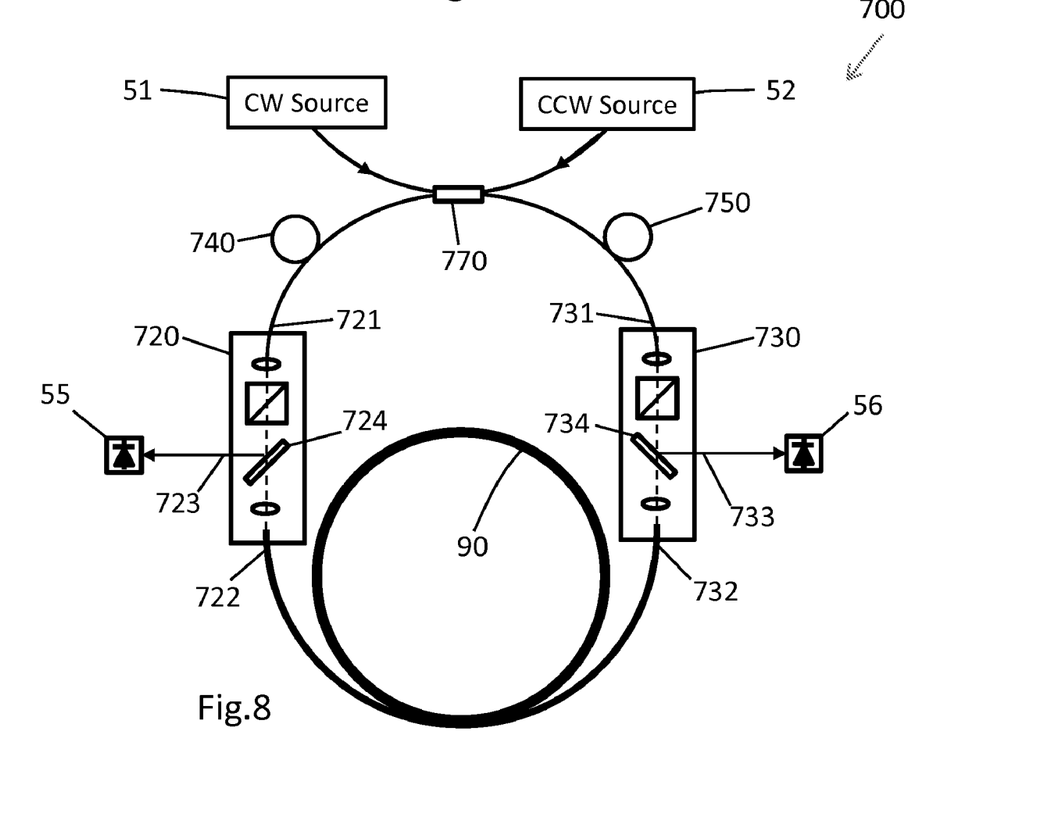
FIG. 8 shows an embodiment of an RFOG with configuration similar to that shown in FIG. 7 but using one fiber coupler and two micro-optic elements for in/out coupling and single mode fibers as mode filters.

FIG. 8 is an embodiment of an RFOG 700 with configuration similar to that shown in FIG. 7, but using a fiber coupler 770 for input coupling, two three-port optical elements 720, 730 for output coupling, and single mode fibers as for filters 740, 750. The input lightwaves are coupled into the resonator by the coupler 770 which can be the same coupler as those described in the previous embodiments. The single mode fiber mode filters 740 and 750 are placed between the input coupler 770 and the optical elements 720 and 730 which have three ports. The elements 720, 730 transmit substantial amount of light between a first port 721, 731 and a second 722, 732 that allows lightwaves to circulate in the resonator. A fraction of light propagating from the first port 721, 731 to the second port 722, 732 is coupled to a third port 723, 733 for output to the photodetectors 55, 56. No light is allowed to couple from the second port 722, 732 to the third port 723, 733. The propagation of light in this embodiment is similar to those described previously and understandable for those skilled in the art; thus, the detailed description is not repeated here.

Figure 9:
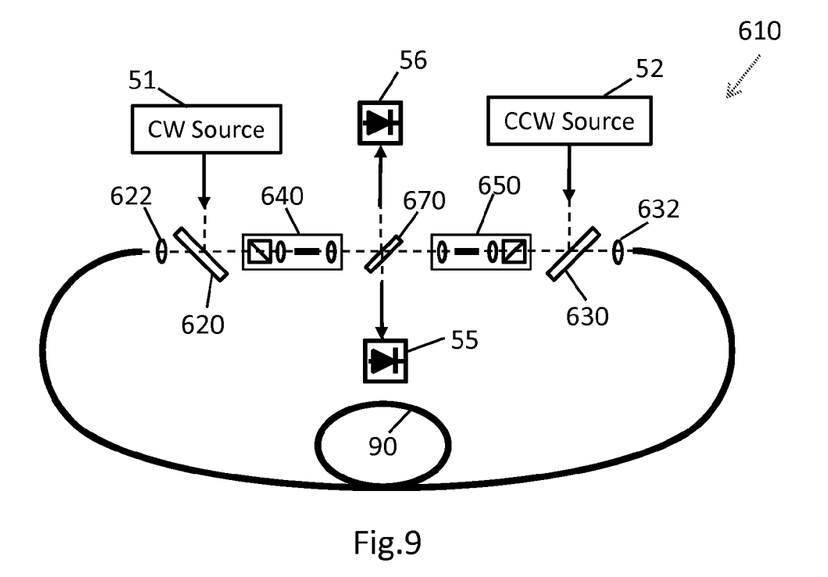
FIG. 9 shows another embodiment of a symmetric RFOG having two spatial mode filters and three in/out coupling elements in the ring cavity.

FIG. 9 shows an embodiment of an RFOG 610 similar to that shown in FIG. 7. However, the positions of the light sources 51, 52 and the detectors 55, 56 are switched. Light from the CW (CCW) sources are coupled into the resonator to propagate in the CW and CCW directions by the elements 620, 630. The element 670 couples a fraction of the light propagating in the resonator in the CW (CCW) directions to the detectors 56, 55. The mode filters 640 and 650 are placed between the input and output coupling elements 620, 630 and the output coupling element 670 so that all lightwaves have to pass at least one of the mode filters 640, 650 at least once before being coupled out of the resonator to the detectors 55, 56. Again, this embodiment is symmetric with respect to CW and CCW waves.

Figure 10:
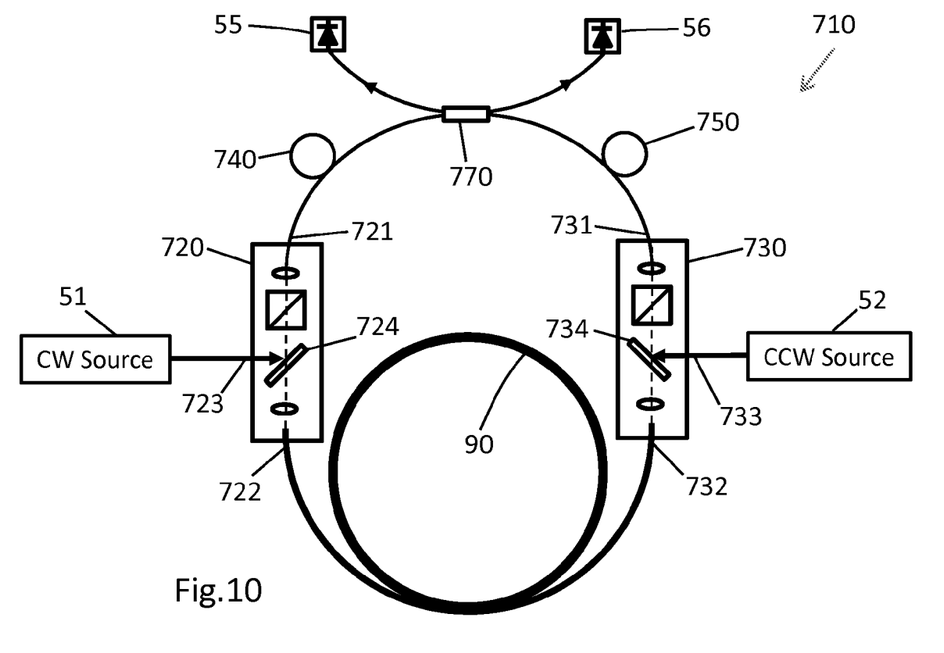
FIG. 10 shows an embodiment of an RFOG with configuration similar to that shown in FIG. 9 but using one fiber coupler and two micro-optic elements for in/out coupling and single mode fibers as mode filters.

FIG. 10 is an embodiment of RFOG 710 similar to that shown in FIG. 8 except that the source and detector positions are switched. This embodiment is similar in the light propagation sequence to the configuration shown in FIG. 9 but output element 670 is replaced by a single mode fiber coupler with mode filtering capability. CW (CCW) lightwaves are coupled into the resonator by the elements 720, 730. They are coupled out to the detectors 56, 55 by the fiber coupler 770. The positions of the mode filters 740, 750 are identical to FIG. 8 so that all lightwaves have to pass at least one mode filter at least once before being coupled out of the resonator to the detectors.

Figure 11:
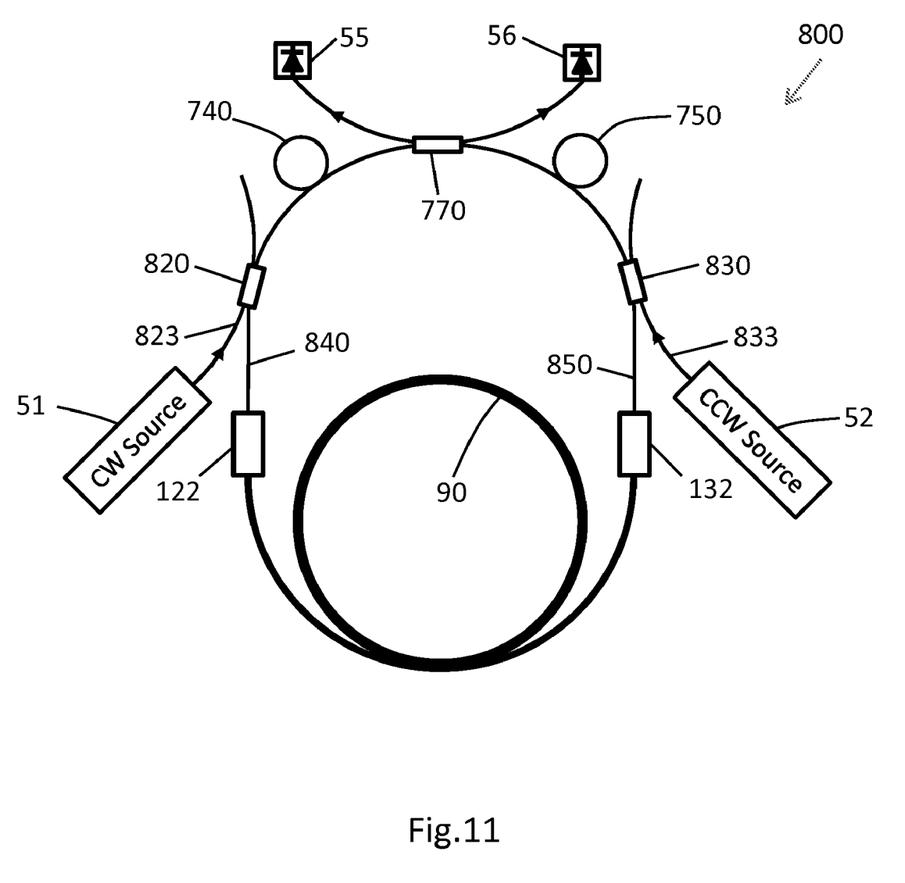
FIG. 11 shows an embodiment of an RFOG with configuration similar to that shown in FIG. 10 but using three fiber couplers for in/out coupling and single mode fibers as mode filters.

FIG. 11 shows an embodiment of an RFOG 800 similar to FIG. 10 except that the input coupling elements 720 and 730 are replaced by fiber couplers 820 and 830. The couplers 820 and 830 are similar to the coupler 770 and preferably are single mode fiber couplers with filtering capability. Light from CW and CCW sources are coupled in the resonator via coupler leads 823 and 833 to travel in the CW and CCW directions within the resonator. Second coupler leads 840 and 850 are connected to the loop fiber 90 by connectors 122 and 132 which are similar to those shown in FIGS. 2-4. The mode filters 740 and 750 have the same functions shown in FIGS. 8 and 10—substantial suppression of modes other than the fundamental mode used for rotation sensing.

Figure 12:
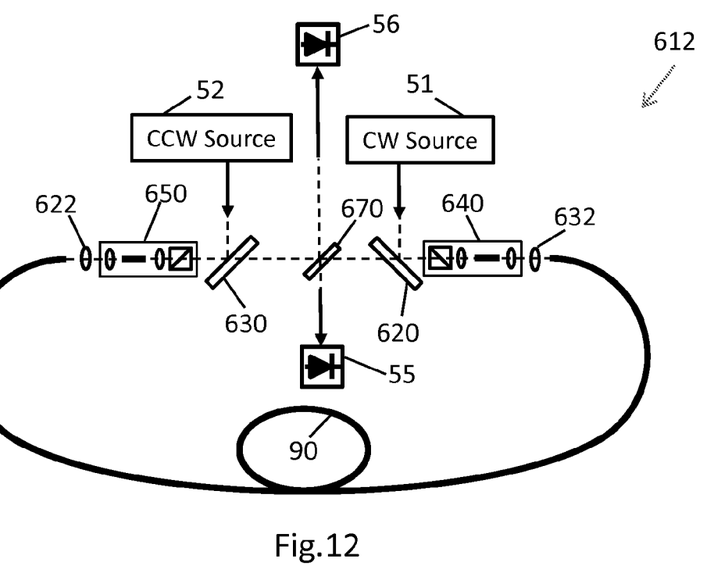
FIG. 12 shows another embodiment of a symmetric RFOG having two spatial mode filters and three in/out coupling elements in the ring cavity.

FIG. 12 shows yet another embodiment of a symmetric RFOG 612. Input lightwaves from the sources 51 and 52 are coupled into the resonator CW and CCW directions by the elements 620 and 630 respectively. CW and CCW lights are coupled out of the resonator by the element 670 into the detectors 55, 56. In this configuration, the mode filters 640 and 650 are placed between the input coupling elements 620 and 630 and the loop fiber ends. All lightwaves exiting the resonator are forced to propagate through both mode filters at least once before being coupled out of the resonator toward the detector.

Figure 13:
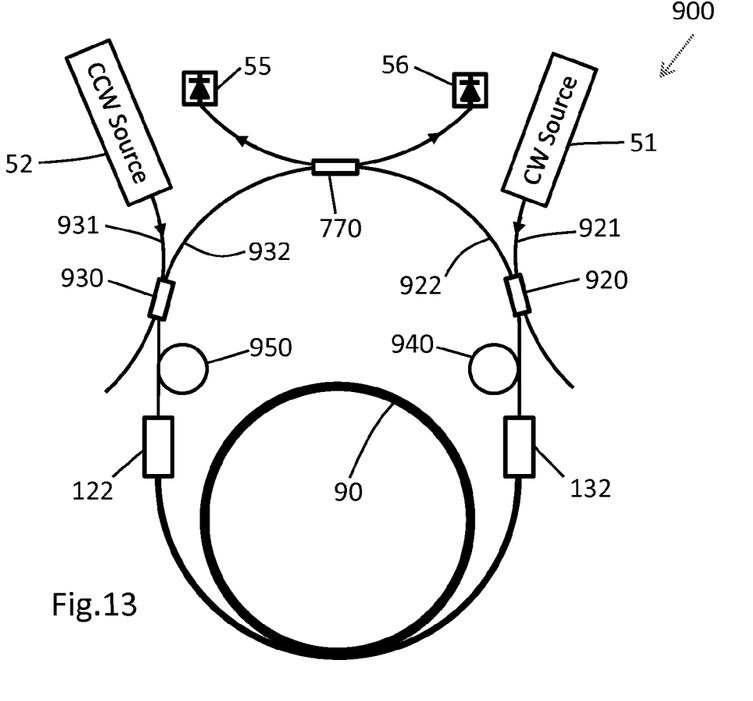
FIG. 13 shows an embodiment of an RFOG with configuration similar to that shown in FIG. 12 but using three fiber couplers for in/out coupling and single mode fibers as mode filters.

FIG. 13 is an embodiment of an RFOG 900 similar to that shown in FIG. 11, but with lightwaves being coupled into the resonator from coupler leads 921 and 931. Mode filters 940 and 950 are placed between couplers 920 and 930 and the loop fiber 90 ends, which are similar to the configuration shown in FIG. 12 in the sequence of of light propagation through similarly functioning elements. It is preferable that fiber that is in the filters 940 and 950 and that forms the leads 922 and 932 form a single piece of single mode fiber so that light loss from fiber connectors (splices) and light-mode-field mismatches can be avoided.

Figure 14:
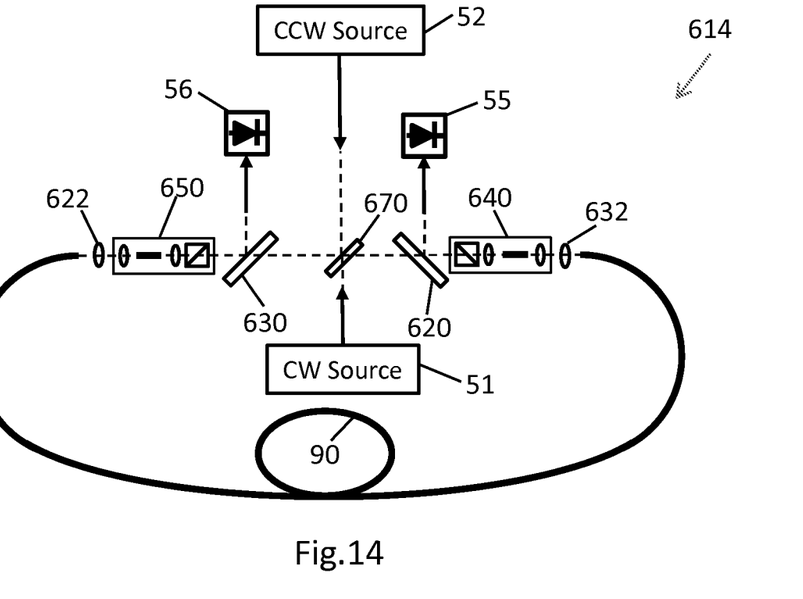
FIG. 14 shows another embodiment of a symmetric RFOG having two spatial mode filters and three in/out coupling elements in the ring cavity.
Figure 15:
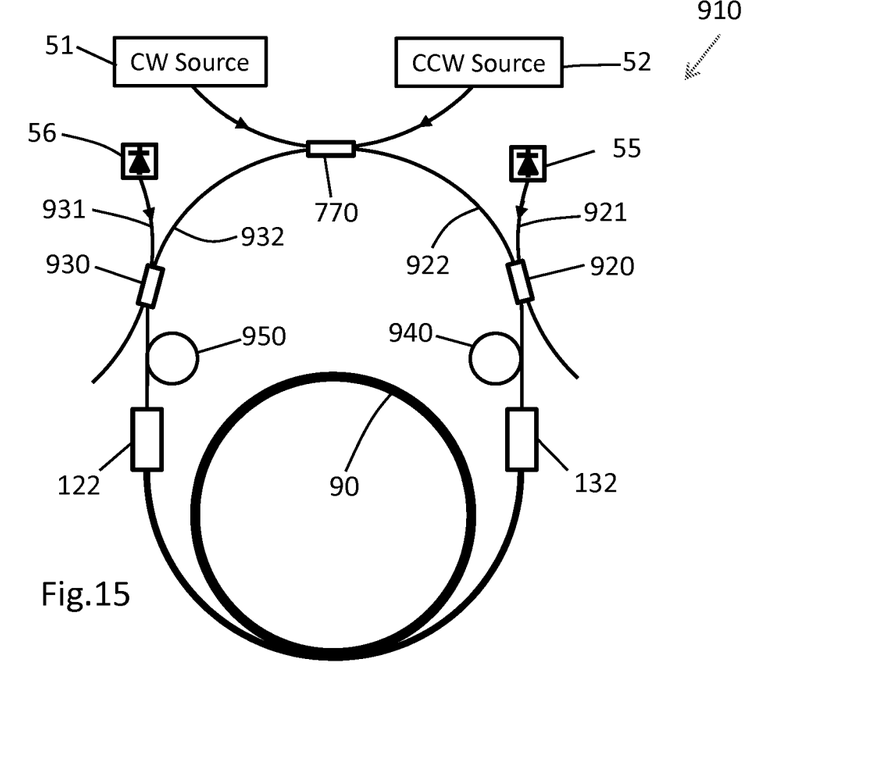
FIG. 15 shows an embodiment of an RFOG with configuration similar to that shown in FIG. 14 but using three fiber couplers for in/out coupling and single mode fibers as mode filters.

FIGS. 14 and 15 are embodiments (RFOG 614, 910) that are similar to those shown in FIGS. 12 and 13 respectively, but with source and detector positions switched. Identical elements are indicated by same labeling numbers and their functions are obvious.

It must be noted that, in many of the drawings and embodiments, a portion of CW (CCW) lightwaves may propagate toward CCW (CW) light sources. To prevent lightwaves from interfering with and destabilizing laser operation, it is important that directional optical isolators are included in all the embodiments so that lightwaves are not coupled into lasers of the counter direction. The isolators can be incorporated in the light path close to the output of the lasers or be included in the directional elements 53 and 54. In addition, all the optical elements are preferably selected or designed to have substantially no back-reflection so that parasitic interference with signal light waves is avoided.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow. are defined as follows:

The embodiments of the invention in which an exclusive property or privilege is claimed are defined as follows:

1. A resonator fiber optic gyroscope having a ring resonator, the gyroscope comprising:
two light sources configured to separately generate light for propagation in the clockwise (CW) and counterclockwise (CCW) direction of the ring resonator;
first and second detectors for separately receiving light associated with the CW and CCW light circulating inside the ring resonator;
wherein the ring resonator comprising:
a loop fiber;
at least two optical coupling elements that direct light from the light sources into the loop fiber, and direct light circulating inside the loop fiber to the first and second detectors;
at least one single mode filter configured to suppress high order spatial modes of light in the CW and CCW directions of the ring resonator,
wherein the light received by the first and second detectors passes through the at least one single mode filter at least once.

2. The gyroscope of claim 1, wherein the at least two optical coupling elements comprise two optical coupling elements,
wherein the first of the two coupling elements is configured to couple light into the CW direction of the resonator and couple light circulating in the CCW direction of the resonator to the first detector,
wherein the second of the two coupling elements is configured to couple light into the CCW direction of the resonator and couple light circulating in the CW direction of the resonator to the second detector.

3. The gyroscope of claim 2, wherein each of the two optical coupling elements includes a directional optical element.

4. The gyroscope of claim 3, wherein the directional optical element comprises at least one of an optical circulator, a fiber coupler or a mirror.

5. The gyroscope of claim 2, wherein the at least one single mode filter is placed between the two optical coupling elements.

6. The gyroscope of claim 5, wherein the single mode filter is a length of single mode fiber connecting the two optical coupling elements.

7. The gyroscope of claim 6, wherein one or more of the coupling elements is an optical fiber coupler made of single mode optical fiber.

8. The gyroscope of claim 2, wherein the at least one single mode filter comprises a first single mode filter and a second single mode filter, the first single mode filter is placed between one of the loop fiber ends and the first coupling element, wherein the second mode filter is placed between the other loop fiber end and the second coupling element.

9. The gyroscope of claim 8, wherein the single mode filters are lengths of single mode fibers.

10. The gyroscope of claim 9, wherein one or more of the coupling elements is an optical fiber coupler made of single mode optical fiber.

11. The gyroscope of claim 1, wherein the at least two optical coupling elements comprise two optical coupling elements,
wherein the first of the two optical coupling elements being configured to couple light into CW and CCW directions of the resonator,
wherein the second of the two coupling elements is configured to couple a portion of the light propagating in the CW and CCW direction of the resonator to the first and second detector.

12. The gyroscope of claim 11, wherein one of the mode filters is placed between the first coupling element and the second coupling element, the other mode filter is placed between the second coupling element and one end of the loop fiber.

13. The gyroscope of claim 12, wherein the mode filters are lengths of single mode fibers.

14. The gyroscope of claim 13, wherein one or more of the coupling elements is an optical fiber coupler made of single mode optical fiber.

15. The gyroscope of claim 1, wherein the at least two optical coupling elements comprise three optical coupling elements,
    wherein the first optical coupling element are configured to couple light into both CW and CCW directions of the resonator,
    wherein the second and third coupling elements are configured to separately couple a portion of the light propagating in CW and CCW directions of the resonator to the first and second detector, respectively.

16. The gyroscope of claim 15, wherein a first of the mode filters is positioned between the first coupling element and the second coupling element, wherein a second of the mode filters is positioned between the first coupling element and the third coupling element.

17. The gyroscope of claim 16, wherein the mode filters are lengths of single mode fiber.

18. The gyroscope of claim 17, wherein one or more of the coupling elements is an optical fiber coupler made of single mode optical fiber.

19. The gyroscope of claim 15, wherein a first mode filter is placed between the second coupling element and one end of the loop fiber, and wherein the second mode filter is placed between the third coupling element and the other end of the loop fiber.

20. The gyroscope of claim 19 wherein the mode filters are lengths of single mode fiber.

21. The gyroscope of claim 20, wherein one or more of the coupling elements is an optical fiber coupler made of single mode optical fiber.

22. The gyroscope of claim 1, wherein the at least two optical coupling elements comprises three optical coupling elements,
    wherein the second and third optical coupling elements are configured to separately couple light into the CW and CCW directions of the resonator;
    wherein the first coupling element is configured to couple portions of light propagating in CW and CCW directions of the resonator to the first and second detector.

23. The gyroscope of claim 22, wherein a first of the mode filters is positioned between the first coupling element and the second coupling element, and wherein a second of the mode filters is positioned between the first coupling element and the third coupling element.

24. The gyroscope of claim 23, wherein the mode filters are lengths of single mode fiber.

25. The gyroscope of claim 24, wherein one or more of the coupling elements is an optical fiber coupler made of single mode optical fiber.

26. The gyroscope of claim 22, wherein a first of the mode filters is placed between the second coupling element and one end of the loop fiber, and wherein a second of the mode filters is placed between the third coupling element and the other end of the loop fiber.

27. The gyroscope of claim 26, wherein the mode filters are lengths of single mode fiber.

28. The gyroscope of claim 27, wherein one or more of the coupling elements is an optical fiber coupler made of single mode optical fiber.

29. A resonator fiber optic gyroscope comprising:
    light sources configured to separately generate light for propagation in the clockwise (CW) and counter-clockwise (CCW) direction of a ring resonator;
    first and second detectors for separately receiving light from the CW and CCW light circulating inside the ring resonator;
    a loop fiber;
    a first means for directing light from the light sources into the resonator;
    a second means for directing light circulating inside resonator to the first and second detectors; and
    a third means for suppressing high order spatial modes of the CW and CCW light in the ring resonator,
    wherein light passed to the first and second detectors passes through the third means at least once.

* * * * *